United States Patent
Han et al.

(10) Patent No.: US 8,804,595 B2
(45) Date of Patent: Aug. 12, 2014

(54) COMMUNICATION TRANSMISSION SYSTEM

(75) Inventors: Huy-Dung Han, Santa Clara, CA (US); Golnaz Farhadi, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 10 days.

(21) Appl. No.: 13/532,594

(22) Filed: Jun. 25, 2012

(65) Prior Publication Data
US 2013/0343255 A1 Dec. 26, 2013

(51) Int. Cl.
*H04W 4/06* (2009.01)

(52) U.S. Cl.
USPC .......................................................... 370/312

(58) Field of Classification Search
USPC ......... 370/235, 252, 329, 312, 328, 332, 335, 370/342, 346
See application file for complete search history.

(56) References Cited

U.S. PATENT DOCUMENTS

| | | | |
|---|---|---|---|
| 2007/0110000 A1 | 5/2007 | Abedi | |
| 2010/0014500 A1* | 1/2010 | Lee et al. | 370/342 |
| 2010/0061473 A1 | 3/2010 | Choi et al. | |
| 2010/0103920 A1 | 4/2010 | Damnjanovic et al. | |
| 2010/0172314 A1* | 7/2010 | Lim et al. | 370/329 |
| 2010/0260050 A1* | 10/2010 | Kimmich et al. | 370/235 |
| 2010/0284292 A1* | 11/2010 | You et al. | 370/252 |
| 2010/0309865 A1 | 12/2010 | Kimura | |
| 2012/0044892 A1* | 2/2012 | Guan et al. | 370/329 |

FOREIGN PATENT DOCUMENTS

| | | |
|---|---|---|
| WO | 2010/027165 A2 | 12/2010 |
| WO | 2011/097758 A1 | 8/2011 |

OTHER PUBLICATIONS

Koksal et al., "Robust Rate-Adaptive Wireless Communication Using ACK/NAK-feedback," in IEEE Transactions on Signal Processing, vol. 60 Issue 4 pp. 1752-1765.
Sarkar, "Optimum scheduling and memory management in input queued switches with finite buffer space," IEEE Trans. Inf. Theory, vol. 50, No. 12, pp. 3197-3220, Dec. 2004.
Chevillat et al., "A dynamic link adaptation algorithm for IEEE 802.11a wireless LANs," in Proc.IEEE ICC'03, Anchorage, May 2003, pp. 1141-1145.
International Search Report and Written Opinion dated May 31, 2013 in application No. PCT/US2013/032355.
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2012.
3GPP TS 36.331, "3rd Generation Partnership Project; Technical Specification Group Radio Access Network; Evolved Universal Terrestrial Radio Access (E-UTRA); Medium Access Control (MAC) protocol specification (Release 10)", Mar. 2012.

(Continued)

*Primary Examiner* — Kwang B Yao
*Assistant Examiner* — Syed M Bokhari
(74) *Attorney, Agent, or Firm* — Maschoff Brennan (57) ABSTRACT

In an example embodiment, a method of adjusting a modulation and coding scheme may include selecting a modulation and coding scheme for multiple terminals and broadcasting a modulation and coding scheme identifier to the terminals. The modulation and coding scheme identifier may be configured to identify the selected modulation and coding scheme such that each of the plurality of terminals transmits a transmission to the base station based at least in part on the selected modulation and coding scheme.

21 Claims, 3 Drawing Sheets

(56) References Cited

OTHER PUBLICATIONS

Chao et al., "Power saving for machine to machine communications in cellular networks," in IEEE GLOBECOM Workshop on M2M Communications., Dec. 2011.
U.S. Appl. No. 13/422,914, filed Mar. 16, 2012, Communication Transmission System.
U.S. Appl. No. 13/517,501, filed Jun. 13, Communication Transmission System.
3GPP TS 36.211 v10.4.0, "3rdGeneration Partnership Project; Technical Specification Group Services and System Aspects; Evolved Universal Terrestrial Radio Access (E-UTRA); Physical Channels and Modulation; (Release 10)", Dec. 2011.
3GPP TS 36.212 v10.4.0, "3rdGeneration Partnership Project; Technical Specification Group Services and System Aspects; Evolved Universal Terrestrial Radio Access (E-UTRA); Multiplexing and channel coding; (Release 10)", Dec. 2011.
3GPP TS 36.213 v10.4.0, "3rdGeneration Partnership Project; Technical Specification Group Services and System Aspects; Evolved Universal Terrestrial Radio Access (E-UTRA); Physical layer procedures; (Release 10)", Dec. 2011.
3GPP TR 23.888 v1.6.1, "3rdGeneration Partnership Project; Technical Specification Group Services and System Aspects; System Improvements for Machine-Type Communications; (Release 11)", Feb. 2012.
Chevillat et al., "A dynamic link adaption algorithm for IEEE 802.11a wireless LANs," in Proc.IEEE ICC'03, Anchorage, May 2003, pp. 1141-1145.
Qiao et al., "Fast-responsive link adaptation for IEEE 802.11. WLANs," in Proc. IEEE ICC'05, Seoul, Korea, May 2005, pp. 3583-3588.
Wong et al., "Robust rate adaptation for 802.11 wireless networks," in Proc. ACM Int. Conf. Mobile Comput. Netw., 2006, pp. 146-157.
Minn et al., "On ARQ scheme with adaptive error control," IEEE Trans. Veh. Technol., vol. 50, pp. 1426-1436, Nov. 2001.
Koksal et al., "Robust Rate-Adaptive Wireless Communication Using ACK/NAK-feedback," in IEEE Transactions on Signal Processing, vol. 60 Issue 4 pp. 1752-1765, Apr. 4, 2012.
Sarkar, "Optimum scheduling and memory management in input queued switches with finite buffer space," IEEE Trans. Int Theory, vol. 50, No. 12, pp. 3197-3220, Dec. 2004.
Bettesh et al., "Optimal power and rate control for minimal average delay: The single-user case," IEEE Trans. Inf. Theory, vol. 52, No. 9, pp. 4115-4141, Sep. 2006.

\* cited by examiner

COMMUNICATION TRANSMISSION SYSTEM

FIELD

The embodiments discussed herein are related to wireless communication systems.

BACKGROUND

Radio access networks such as Long Term Evolution (LTE) and Long Term Evolution Advanced (LTE-A) networks may be used for machine to machine (M2M) communications, also known as machine type communications (MTC). Generally, MTC may allow a device to remotely report information over the radio access network to an MTC application and/or an MTC server that collects the information. Devices employing MTC may be used in a variety of situations. An example of such a situation may include smart meters that report resource consumption to a utility company server via the radio access network. Other examples of applications that may utilize MTC include security networks for use in surveillance, alarm systems or people tracking systems, transportation networks, fleet management, toll collection, emission control, electronic health (eHealth) applications; manufacturing monitoring and automation, and facility management, including home, building, and/or campus automation. Because of the number of applications, devices employing MTC on a given radio access network may have the potential to substantially outnumber the devices used for human to human (H2H) communication. Radio access networks have also seen a large growth in wireless data communication from its users. Future growth in data communications may lead to a deficit in spectrum available for radio access networks.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of adjusting a modulation and coding scheme may include selecting a modulation and coding scheme for multiple terminals and broadcasting a modulation and coding scheme identifier to the terminals. The modulation and coding scheme identifier may be configured to identify the selected modulation and coding scheme such that each of the terminals transmits a transmission to the base station based at least in part on the selected modulation and coding scheme.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may relate to a telecommunication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example telecommunication systems described. Rather, the embodiments described herein may be applicable to other communication systems. In addition, some embodiments are herein described in relation to devices employing machine-type communication (MTC). However, the embodiments described herein are not limited to MTC devices or MTC communication. Rather, the embodiments described herein may be applicable to other devices and other types of communication, including, but not limited to, user equipment (UE) communication with applications and/or servers.

Embodiments of the present invention will be explained with reference to the accompanying drawings.

Figure 1:
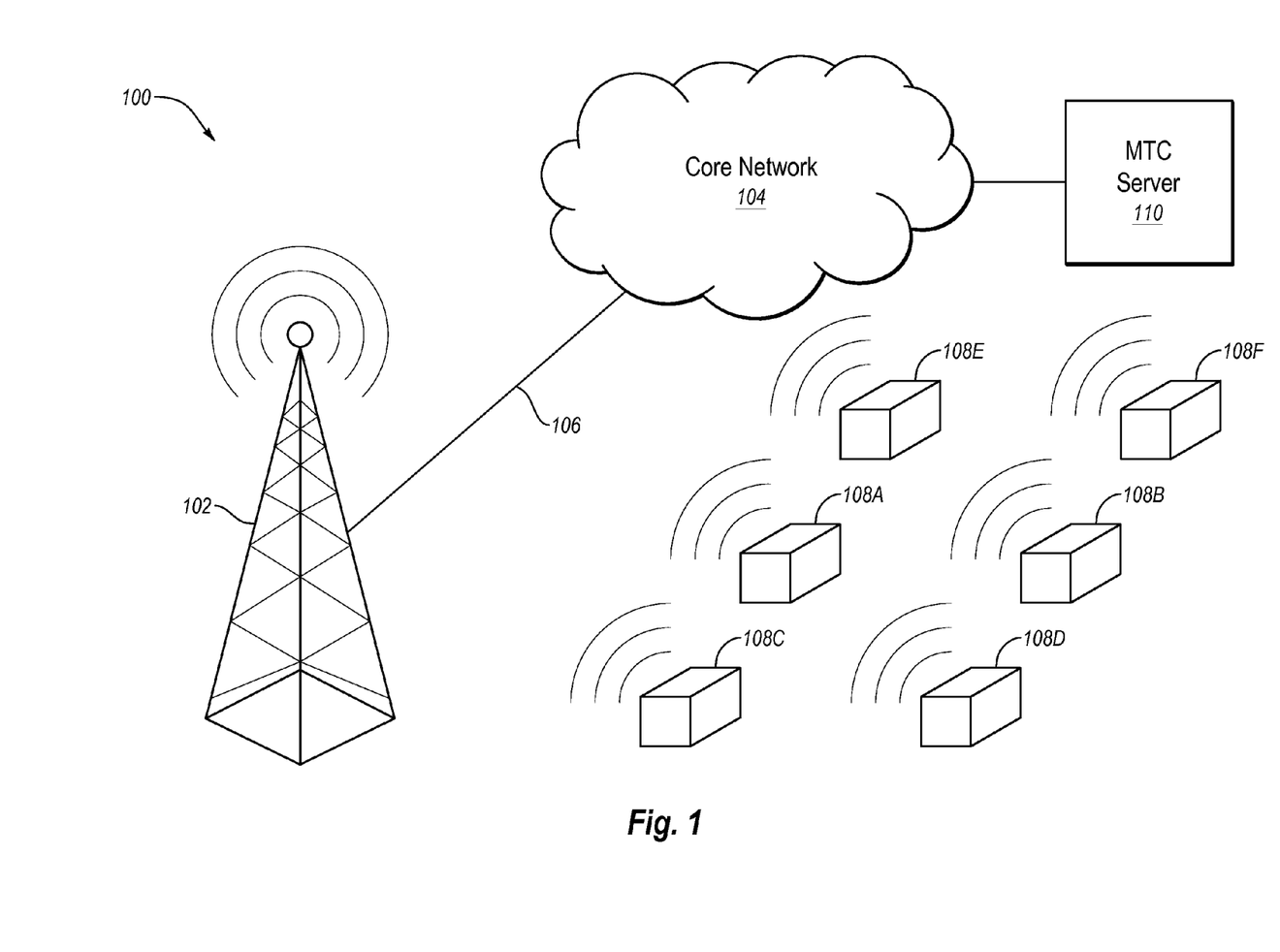
FIG. 1 illustrates an example network architecture of a telecommunication system.

FIG. 1 illustrates an example network architecture of a telecommunication system 100. The telecommunication system 100 may include the network architecture of an Evolved Universal Mobile Telecommunications System (E-UMTS). The E-UMTS may include an LTE radio access network or the like. In some embodiments, the telecommunication system 100 may include an E-UMTS Terrestrial Radio Access Network (eUTRAN). In these and other embodiments, the radio access network may include a base station 102.

The base station 102 may include base station equipment, including hardware and/or software configured for communication with terminals 108A, 108B, 108C, 108D, 108E, 108F (collectively "terminals 108"), other base stations or a core network 104. The base station 102 may include one or more antenna for transmitting and receiving radio transmissions. In some embodiments, the base station 102 may include a core network communication interface 106. For example, the core network communication interface 106 may include an Si interface as part of an LTE network. Generally, the base station 102 may provide wireless access to the radio access network for an area of land known as a cell. Although only one base station 102 is shown, the radio access network may include additional base stations, for example, to provide radio access to a large geographic area. The base station 102 may provide access for multiple cells. In some embodiments, the base station 102 may include one or more Evolved Node B (eNodeB) logical nodes, for example, as part of an LTE network.

The terminals 108 may include equipment to communicate wirelessly. For example, each terminal 108 may include hardware and/or software configured to allow communication with the base station 102 via a radio access interface of the corresponding terminal 108. In some embodiments, communication via a radio access interface may include the use of a band of wireless spectrum licensed for cellular radio access network communication. As used herein, a radio access interface of a corresponding one of the terminals 108 may include the hardware and/or software of the corresponding terminal 108 that enables the corresponding terminal 108 to communicate via the radio access network.

The terminals 108 may include devices configured to communicate data via the telecommunication system 100. In these and other embodiments, the terminals 108 may include UE devices, including but not limited to, mobile phones, tablet computers, laptop computers and the like. Alternately or additionally, the terminals 108 may include devices configured for MTC communication with an MTC server 110 in communication with the core network 104. Examples of such devices may include, but are not limited to, surveillance and alarm devices, utility measuring and metering devices, manufacturing monitoring and automation devices, facility management devices, and the like.

In some embodiments, access procedures may be completed before the terminals 108 communicate directly with the base station 102 via the radio access interface of the corresponding terminal 108. Access procedures may include synchronizing with and performing a random-access procedure with the base station 102. The base station 102 may be associated with a cell within which the terminals 108 are located. Access procedures may include establishing a radio resource control (RRC) connection, for example, as part of access procedures in an LTE network. Alternately or additionally, other access procedures may be used.

In some embodiments, establishing an RRC connection for a terminal, for example, the terminal 108A, may include the following messaging steps. The terminal 108A may transmit a random access preamble allowing the base station 102 to estimate transmission timing of the terminal 108A. If the random access attempt is successful, the base station 102 may transmit a random access response. Transmitting the random access preamble and receiving the random access response may establish uplink (UL) synchronization and may allocate uplink resources to be used in later steps of the access procedure. If the random access attempt is not successful, the base station 102 may send a random access reject message and the terminal 108A may send another random access preamble. Terminal 108A may transmit another signal including a terminal identity, a buffer status report, or other data. In some embodiments, the base station 102 may respond by transmitting an RRC connection setup message. The RRC connection setup message may include configuration information necessary for the terminal 108A to communicate over the network via the base station 102. The terminal 108A may respond with an RRC connection setup complete message, which may include information for the base station 102 to complete the connection. The base station 102 may receive the connection setup complete message, and in response the terminal 108A may be considered connected to the base station 102. Alternately or additionally, other procedures may be employed to establish a connection between the terminal 108A and the base station 102.

In some embodiments, the terminals 108 may be assigned to a group. Groups may be formed based on characteristics of the terminals 108. For example, a group may be formed from terminals 108 with low mobility and high tolerance for transmission delay. However, other characteristics may include MTC features, server, subscriber, quality of service requirements, geographical deployments, channel conditions, or the like. Optionally, some or all of the terminals 108 assigned to the group may be further assigned to a cluster. A cluster may be a subset of a group.

In some embodiments, terminals 108 may be assigned to a group and/or a cluster when performing access procedures with the base station 102 for the first time. For example terminals 108A, 108B, 108C, 108D, 108E and 108F may form a group and/or cluster. When each of the terminals 108 is assigned to the group or cluster, each of the terminals 108 may be informed of its inclusion in the group and/or cluster. Each of the terminals 108 may further be informed of a group ID and/or cluster ID.

In some embodiments, the base station 102 may assign the terminals 108 resources for communicating with the base station 102 via the radio access interface of each terminal 108. For example, the base station 102 may provide the terminals 108 UL transmission windows during which the terminals 108 may transmit transmissions. In these and other embodiments, the base station 102 may employ time division multiplexing (TDM) to schedule transmissions. For example, the base station 102 may schedule windows of time dedicated to receiving UL transmissions of the terminal 108A on a particular frequency band; outside of the dedicated time windows, the same frequency band may be used for downlink (DL) transmissions or UL transmissions by other terminals 108 connected to the base station 102.

In some embodiments, the base station 102 and/or the terminals 108 may employ retransmission procedures for transmission error correction. For example, the base station 102 and/or the terminals 108 may employ hybrid automatic repeat request (HARQ). When employing HARQ and/or other procedures for transmission error correction, a transmitting entity such as the base station 102 and/or the terminal 108A may transmit a transmission and then wait for a positive acknowledgement or a negative acknowledgement. A receiving entity such as the base station 102 and/or the terminal 108A may receive the transmission and may respond with a positive or negative acknowledgement. A positive acknowledgement may indicate that data contained in the transmission was properly received. A negative acknowledgement may indicate that the data contained in the transmission was not properly received. If the transmitting entity receives a positive acknowledgement, the transmitting entity may transmit a new transmission. If the transmitting entity receives a negative acknowledgement, the transmitting entity may retransmit the same transmission.

The base station 102 and/or the terminals 108 may alternately or additionally employ go-back-N automatic repeat request (go-back-N ARQ). When employing go-back-N ARQ, a transmitting entity may send transmissions during an entire transmitting window regardless of whether the transmitting entity receives a positive acknowledgement for each transmission. The receiving entity may send a positive acknowledgement for each transmission received without error. If the transmitting entity does not receive a positive acknowledgement for a particular transmission, the transmitting entity may resend the particular transmission and each subsequent transmission in a next window.

In some embodiments, a success rate experienced by the terminal 108A when transmitting transmissions may be related to a utilization of a channel between the terminal 108A and the base station 102. The success rate may be related to the rate at which the terminal 108A receives a positive acknowledgement in response to transmissions transmitted to the base station 102. Alternately or additionally, the success rate may be inversely related to the rate at which the terminal 108A receives a negative acknowledgement in response to transmissions transmitted to the base station.

Very high success rates and low success rates may both indicate that the terminal 108A is under-utilizing the channel available to the terminal 108A. For example, a very high success rate may indicate that the terminal 108A is transmitting information at a data rate slower than an optimum data rate. A very high success rate may indicate that the terminal 108A might transmit transmissions to base station 102 at a higher data rate while maintaining a relatively high success rate.

However, a low success rate may also indicate that the terminal 108A is under-utilizing the channel conditions between the terminal 108A and the base station 102 due to performance degradation. For example, if the terminal 108A attempts to transmit transmissions to the base station 102 at a data rate above what the channel may practically allow, performance may be degraded because the amount of data that the base station 102 may be able to extract from the transmissions may be limited. Optimal data rates for utilizing channel conditions may be related to a signal to interference plus noise ratio (SINR) experienced by the terminal 108A and base station 102 over the channel. The SINR may be determined from communication between the base station 102 and terminal 108A during the terminal's 108A access procedures, transmission scheduling requests, prior transmissions, or the like.

The base station 102 and terminals 108 may employ modulation and coding schemes (MCSs) for transmitting transmissions. The MCSs may indicate a type of modulation to be used for the transmissions. For example, the MCSs may indicate that quadrature phase shift keying (QPSK) modulation, 16 quadrature amplitude modulation (16-QAM), or 64 quadrature amplitude modulation (64-QAM) may be used for the transmissions. Alternately or additionally, the MCSs may indicate a transport block size (TBS) to be used for the transmissions. The modulation and/or TBS used for transmitting transmissions may affect the data rate of the transmission.

The MCS may be selected for a transmission based on the SINR experienced by the base station 102 and the terminals 108 over a desired transmission channel. For example, a channel with a higher SINR may permit the terminal 108A to transmit data to the base station 102 at a higher rate than a lower SINR. An MCS may be selected for the terminal 108A based on the data rate associated with the MCS. For example, an MCS may be selected that may allow the terminal 108A to transmit over the channel using an optimal data transmission rate.

In some embodiments, an MCS may be selected for each of the terminals and communicated to each of the terminals 108 by the base station 102. For example, the base station 102 may send an MCS, or more particularly a message or other data identifying the MCS, to a terminal 108A when the base station provides the terminal 108A with UL resources.

An MCS identifier may be used to identify an MCS to the terminals 108 and/or base station 102 such that a modulation scheme and/or TBS do not need to be explicitly identified. In some embodiments, an MCS index may be used by the base station 102 and terminals 108 to identify multiple pre-determined MCSs. The pre-determined MCSs may be defined by a wireless communication standard, e.g., an LTE standard. The MCS index may associate index numbers and/or codes with predetermined MCSs. The base station 102 and/or the terminals 108 may reference an MCS by an associated index number. In some embodiments, the MCS index may organize the MCSs by data rates. For example, higher index numbers may be generally associated with MCSs allowing higher data rates than those associated with lower index numbers.

In some embodiments, the base station 102 may provide one MCS to multiple terminals 108 for each of the multiple terminals 108 to use for transmissions. Broadcasting a single MCS to multiple terminals 108 may reduce the signaling overhead associated with providing the terminals 108 with MCSs. In some embodiments, the MCS selected to broadcast to multiple terminals 108 may be selected based on an average SINR of the multiple terminals 108. Alternately or additionally, the MCS may be selected based on a lowest SINR of the multiple terminals 108. The base station 102 may broadcast one MCS to multiple terminals 108 that have been assigned to a group. Alternately or additionally, the base station 102 may broadcast one MCS to one or more clusters of terminals 108 within the group. For example, terminals 108A, 108B, and 108C may be assigned to a first cluster and terminals 108D, 108E, and 108F may be assigned to a second cluster. The base station 102 may broadcast a first MCS to the first cluster of terminals 108A, 108B and 108C, and/or a second MCS for the second cluster of terminals 108D, 108E, and 108F. Clusters may be formed by terminals 108 of the group with similar SINR characteristics. Whether a group of terminals 108 is divided into clusters, and/or the number of clusters formed may be based on overhead and utilization tradeoffs.

In some embodiments, the base station 102 may specify to the terminals 108 that a provided MCS is to be used by each of the terminals of a group in a downlink control information (DCI) physical control channel. For example, the base station 102 may use a modified LTE DCI format to specify that an MCS is to be used as a group MCS. The base station 102 may use one bit previously dedicated as zero-padding in the DCI format 0. Furthermore, the modified DCI format may include a few bits for specifying the cluster index associated with the MCS index.

Higher quality channel conditions may permit a terminal 108A to transmit transmissions at higher data rates. In a group of terminals 108 with data reports to transmit to the base station, terminals 108 with better channel conditions may potentially complete the data report in less time than terminals 108 with poorer channel conditions. Resources assigned to the terminals 108 with better channel conditions may be freed up more quickly for the base station 102 to reallocate if the terminals 108 are allowed to improve utilization of the channel. In some embodiments, resources previously allocated to terminals 108 that have finished transmitting ahead of other terminals 108 in the group may be allocated to other services (not shown), while the remaining terminals 108 may continue to transmit over the scheduled resources.

The base station 102 may specify to the terminals 108 that the terminals 108 may adjust the MCS used for transmissions, including the MCS used for the first transmission by each of the terminals 108. In some embodiments, the base station 102 may use a channel state information (CSI) request bit of the DCI format 0 defined by LTE specifications to specify to the terminals 108 that the terminals 108 may adjust the MCS. Alternately or additionally, a bit may be added to the current DCI format 0 to allow the base station 102 to specific to the terminals 108 that the terminals 108 may adjust the MCS.

The terminals 108 may adjust the MCS to attempt to improve the utilization of channel conditions. In some instances, when a terminal 108A is assigned an MCS intended for multiple terminals 108, the MCS may be associated with a data rate that leads to under-utilization of the channel conditions. Adjusting MCSs at the terminals 108 may allow each of the terminals 108 to improve the utilization of channels without requiring large signaling overhead from the base station 102.

In some embodiments, the terminals 108 may adjust their MCSs based on the transmission error rates of the MCSs. As previously discussed, the error rates may be related to channel optimization. Then terminals 108 may consider a target error rate when adjusting the MCS. For example, the target error rate may be 0.1 (10%), 0.05 (5%), or any desired target error rate. Alternately or additionally, the terminals 108 may consider a target success rate when adjusting the MCS. The target success rate may be inversely related to the target error rate. For example, if the target error rate is 0.1 or 0.05, the target success rate may be 0.9 (90%) or 0.95 (95%).

Figure 2:
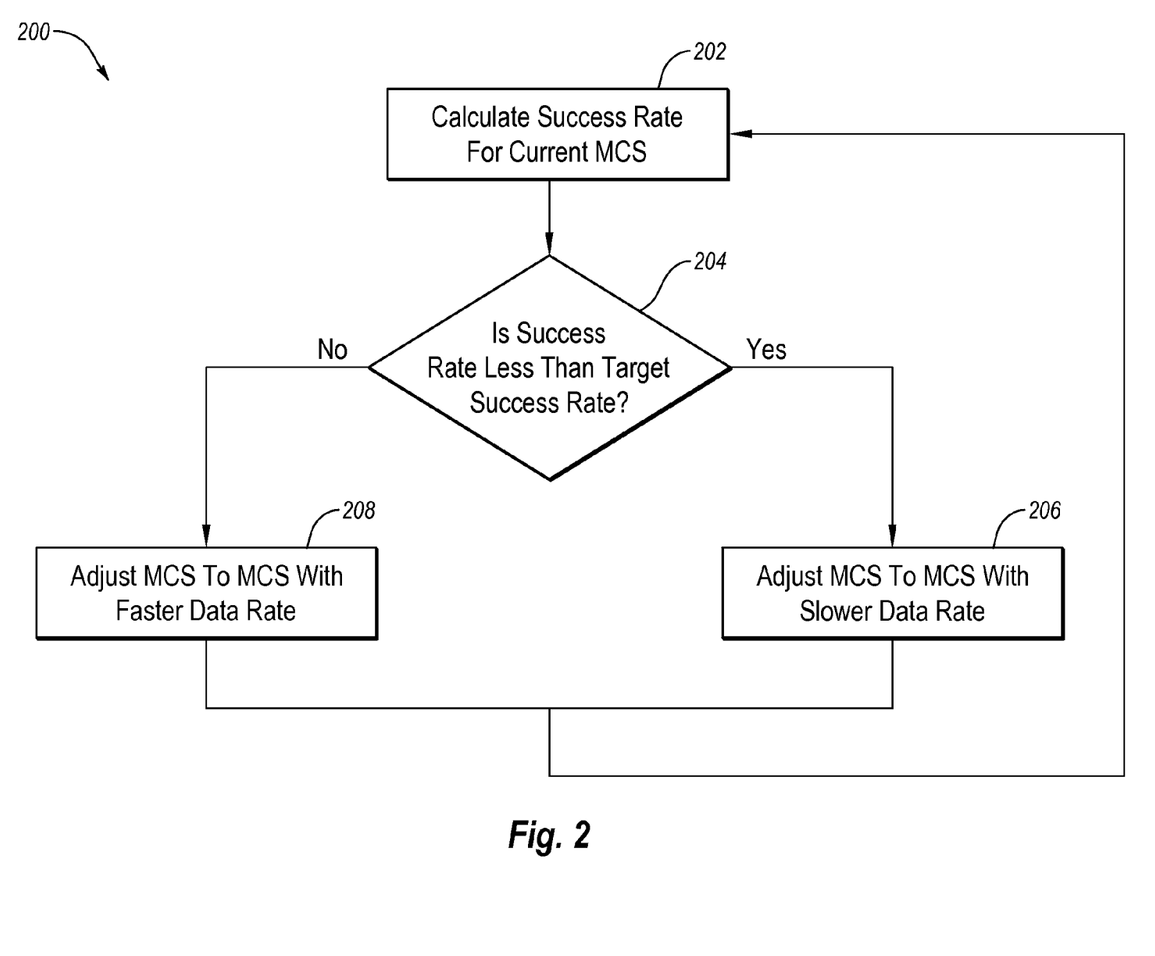
FIG. 2 is a flowchart of an example method of adjusting a modulation and coding scheme (MCS) based on a target success rate that may be implemented in the telecommunication system of FIG. 1.

FIG. 2 is a flowchart of an example method 200 of adjusting an MCS based on a target success rate that may be implemented in the telecommunication system 100 of FIG. 1. The method 200 may be performed, in whole or in part, by a terminal, such as any of the terminals 108 of FIG. 1. In these and other embodiments, and as described above, a terminal may transmit transmissions to a base station using an MCS. The terminal may experience a success rate associated with the transmissions transmitted using the MCS. The terminal may generally correspond to the terminal 108A or any of the other terminals 108 of FIG. 1. The base station may generally correspond to the base station 102 of FIG. 1. As previously discussed, the MCS may define a modulation and coding scheme for the transmissions and the MCS may be associated with a data rate.

At block 202, the terminal may calculate a success rate for the current MCS. The terminal may calculate the success rate based on the rate at which the terminal receives a positive acknowledgement in response to a transmission. For example, the success rate of the MCS may be equal to the number of positive acknowledgements received divided by the total acknowledgements received for transmissions transmitted using the MCS.

In some embodiments, the terminal may consider a historical success rate of the MCS and/or an immediate success rate of the MCS in calculating the success rate. The terminal may calculate the success rate based on the historical success rate and/or the immediate success rate using the following equation.

$$r = \lambda r_{historical} + (1-\lambda)a$$

In the equation, r may be the calculated success rate for the MCS and $r_{historical}$ may be the historical success rate for the MCS. For example, $r_{historical}$ may be equal to r calculated at a prior success rate calculation. The variable a may be the immediate success rate, for example, the success rate of the most recently acknowledged transmission for the MCS. For example, if the terminal receives a positive acknowledgement, a may be equal to 1; if the terminal receives a negative acknowledgement, a may be equal to 0. The variable 2 may be a dependency factor defined between the values of 0 and 1. The higher the value of 2, the more the calculated success rate may depend on the historical success rate over the immediate success rate. In some embodiments, a historical success rate may be stored for multiple MCSs the terminal may use to transmit transmissions. Alternately or additionally, the use of a historical success rate for each MCS may free the terminal from having to store a historical count of each positive and/or negative acknowledgement received for each MCS.

At block 204, the terminal may determine whether the success rate for the current MCS is less than the target success rate. If the success rate for the current MCS is less than the target success rate, the method 200 may continue to block 206. If the success rate for the current MCS is not less than the target success rate, the method 200 may continue to block 208.

In some embodiments, a target success rate range may be used. For example, if the success rate for the current MCS is less than the target success rate range, the method may continue to block 206. If the success rate is above the target success rate range, the method may continue to block 208. If the success rate is within the target success rate range, the method may return to block 202.

At block 206, the terminal may adjust the MCS to an MCS with a slower data rate. In some embodiments, the terminal may use an MCS with a lower MCS index. For example, the terminal may lower the MCS index by 1.

At block 208, the terminal may adjust the MCS to an MCS with a faster data rate. In some embodiments, the terminal may use an MCS with a higher MCS index. For example, the terminal may increase the MCS index by 1.

The terminal may inform the base station that the MCS has been adjusted so that the base station may properly decode the terminal's transmissions using the new MCS. In some embodiments, a signaling scheme may be provided for the terminals to report MCS adjustments. The signaling scheme may include a new, extended, or existing DCI format. For example, the terminal may use a CSI request to report MCS adjustments. The terminal may report a value corresponding to the MCS index of a new MCS in addition to or in place of a real CSI value. Alternately or additionally, a signaling scheme may be associated with incrementing, decrementing, and/or holding an MCS index value. For example, the terminal may transmit a two-bit signal wherein the signal 00 may indicate no change to the current MCS, 01 may indicate the MCS index has been incremented by 1, and/or 10 may indicate the MCS index has been decremented by 1.

From blocks 206 and 208, the blocks may return to block 202, where the terminals may calculate the success rate of the current MCS. If the MCS was adjusted in blocks 206 or 208, the current MCS may be different from the previous MCS. The historical success rate associated with the MCS may also be different from the success rate associated with the previous MCS.

Figure 3:
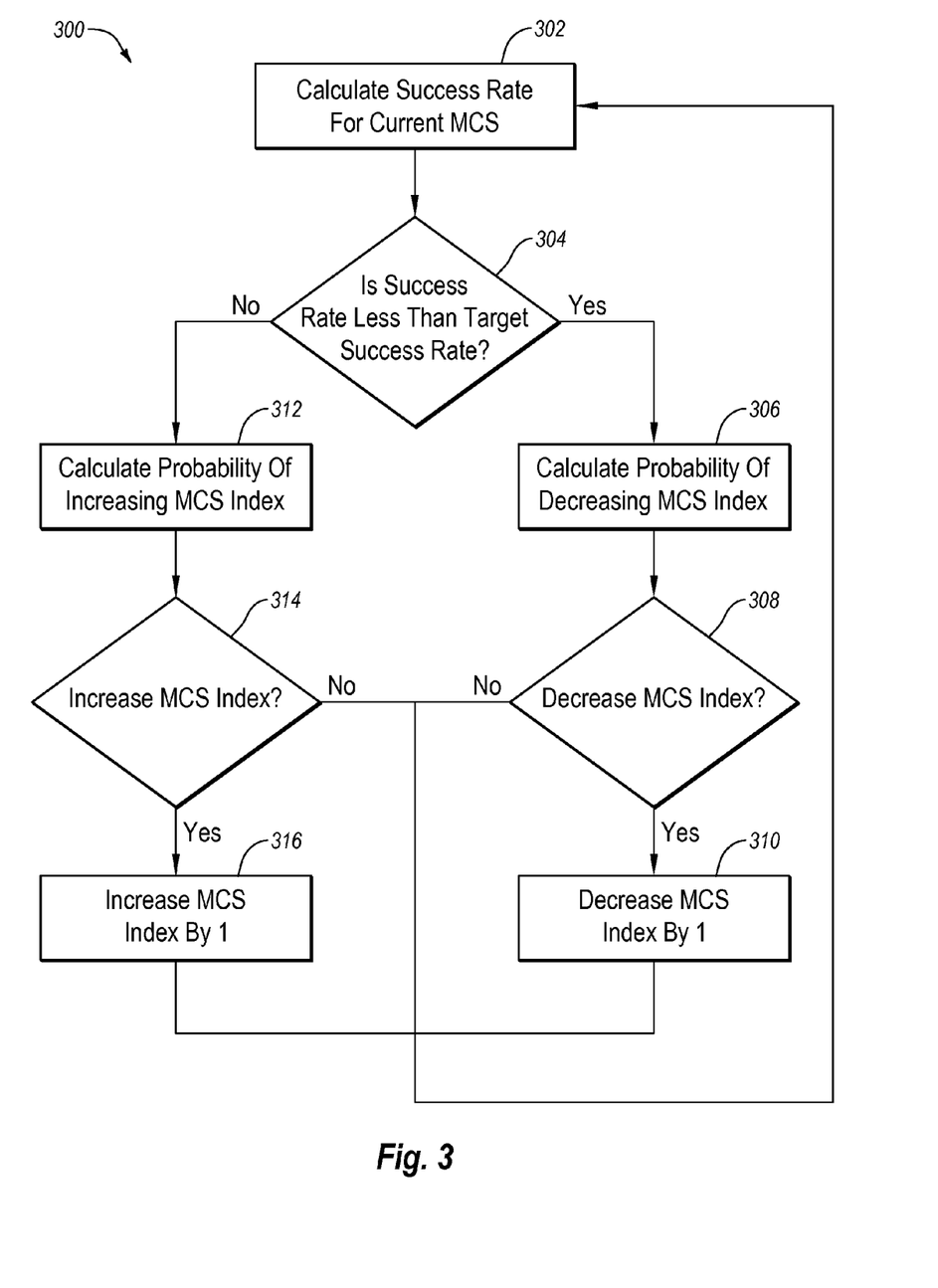
FIG. 3 is a flowchart of an example method of adjusting an MCS based on a target success rate and probability decision making that may be implemented in the telecommunication system of FIG. 1.

FIG. 3 is a flowchart of an example method 300 of adjusting an MCS based on a target success rate and probability decision making that may be implemented in the telecommunication system of FIG. 1. The method may be performed, in whole or in part, by a terminal, such as any of the terminals 108 of FIG. 1. In these and other embodiments, adjusting an MCS based on probability decision making may reduce the effect of the MCS oscillating between an MCS with a success rate above a target success rate and another MCS with a success rate below the target success rate. As already described, a terminal may transmit transmissions to a base station using an MCS. The terminal may experience a success rate associated with the transmissions transmitted using the MCS. The terminal may generally correspond to the terminal 108A or any of the other terminals 108 of FIG. 1. The base station may generally correspond to the base station 102 of FIG. 1. As previously discussed, the MCS may define a modulation and coding scheme for the transmissions and may be associated with a data rate.

At block 302, the terminal may calculate a success rate for the current MCS. Calculating the success rate may be done as generally described with reference to block 202 in FIG. 2. Alternately or additionally, a minimum success rate may be defined. The terminal may calculate the success rate based on the historical success rate, the immediate success rate, or a minimum success rate using the following equation.

$$r = \max\{\lambda r_{historical} + (1-\lambda)a, r_{min}\}$$

In the equation, r, $r_{historical}$, a, and λ may generally correspond to the respective variables of the equation described with reference to block 202 of FIG. 2. The function max{x,y} may take the largest value of x or y. The constant $r_{min}$ may correspond to a minimum success rate that may be associated with an MCS. The minimum success rate may be set as a design parameter. In some embodiments, setting a minimum success rate may expedite a terminal's convergence towards an MCS that may allow the terminal to effectively utilize a channel.

At block 304, the terminal may determine whether the success rate for the current MCS is less than the target success rate. If the success rate for the current MCS is less than the target success rate, the method 300 may continue to block 306. If the success rate for the current MCS is not less than the target success rate, the method 300 may continue to block 312. In some embodiments, a target success rate range may be used. For example, if the success rate for the current MCS is within the target success rate range, the method may return to block 302.

At block 306, the terminal may calculate a probability of decreasing the MCS index. In some embodiments, the calculated probability may be based at least in part on the success rate of an MCS associated with a next lower MCS index. The terminal may calculate the probability of decreasing the MCS index based on the success rate of the current MCS and the success rate of the MCS associated with the next lower MCS index using the following equation.

$$p_{decrease} = \frac{r_{-mcs}}{r_{-mcs} + r}$$

In the equation, $p_{decrease}$ may represent the probability of decreasing the MCS index by one. The probability may be a number between the values of 0 and 1. The variable $r_{-mcs}$ may be the success rate of the MCS associated with the MCS index one less than the current MCS index. As discussed previously, r may be the success rate of the current MCS.

In some embodiments, the terminal may calculate the probability such that the probability of decreasing the MCS index does not fall below a minimum probability. For example, if $p_{decrease}$ as calculated is below a minimum probability, the minimum probability may be substituted for $p_{decrease}$. Observing a minimum probability may encourage the terminal to explore MCSs that may have a low recorded success rate. For example, an MCS may have a low recorded success rate based on a small sample of transmissions including an unrepresentative number of negative acknowledgements. Alternately or additionally, a low recorded success rate may result due to the settings of the dependency factor X of the success rate equation.

At block 308, the terminal may determine whether to decrease the MCS index. Whether to decrease the MCS index may be based on the probability $p_{decrease}$ calculated in block 306. In some embodiments, the terminal may randomly determine whether to decrease the MCS index based on the probability $p_{decrease}$. For example, the terminal may generate a random number between 0 and 1. If the generated number is less than or equal to the probability calculated in block 306, the method 300 may continue to block 310. Otherwise, the method may return to block 302.

At block 310, the terminal may decrease the MCS index by one. The terminal may inform the base station that the MCS has been adjusted so that the base station may properly decode the terminal's transmissions using the new MCS. Informing the base station that the MCS has been adjusted may generally be done in a manner similar to the manner described with reference to FIG. 2.

At block 312, the terminal may calculate a probability of increasing the MCS index. In some embodiments, the calculated probability may be based at least in part on the success rate of an MCS associated with a next higher MCS index. The terminal may calculate the probability of increasing the MCS index based on the success rate of the current MCS and the success rate of the MCS associated with the next higher MCS index using the following equation.

$$p_{increase} = \frac{r_{+mcs}}{r_{+mcs} + r}$$

In the equation, $p_{increase}$ may represent the probability of increasing the MCS index by one. The probability may be a number between the values of 0 and 1. The variable $r_{+mcs}$ may be the success rate of the MCS associated with the MCS index one more than the current MCS index. As discussed previously, r may be the success rate of the current MCS.

In some embodiments, the terminal may calculate the probability such that the probability of increasing the MCS index does not fall below the minimum probability. For example, if $p_{increase}$ as calculated is below the minimum probability, the minimum probability may be substituted for $p_{increase}$.

At block 314, the terminal may determine whether to increase the MCS index. Whether to increase the MCS index may be based on the probability $p_{increase}$ calculated in block 312. In some embodiments, the terminal may randomly determine whether to increase the MCS index based on the probability $p_{increase}$. For example, the terminal may generate a random number between 0 and 1. If the generated number is less than or equal to the probability calculated in block 312, the method 300 may continue to block 316. Otherwise, the method may return to block 302.

At block 316, the terminal may increase the MCS index by one. The terminal may inform the base station that the MCS has been adjusted so that the base station may properly decode the terminal's transmissions using the new MCS.

From blocks 308, 310, 314, and/or 316, the method 300 may return to block 302, where the terminals may calculate the success rate of the current MCS. If the MCS was adjusted in blocks 310 or 316, the current MCS may be different from the previous MCS. The historical success rate associated with the current MCS may also be different from the success rate associated with the previous MCS.

In some embodiments, the terminal may employ a Markov Decision Process (MDP). Employing the MDP may allow a terminal to converge on an MCS or MCSs at an increased rate. For example, the MDP may allow a terminal to more aggressively change the MCS at the beginning of transmission. An MDP over a set of time slots may consist of the following elements: a set of states S, a set of actions A, and a set of transition probability P among states using particular actions. For each action, there may be an associated immediate reward R. The MDP may maximize the long term value of reward by performing an optimum policy. The MDP may be based on immediate positive or negative acknowledgements and/or may consider the average SINR of a group, which may be available to all terminals in the group. The elements of the MDP formulation may be described as follows.

The state s of MDP at time k may be defined as the immediate positive or negative acknowledgement $a_k$ and the corresponding MCS index $m_k$ such that s={$(m_k, a_k)$}.

The action a of the next time slot k+1 may be to increase or decrease the MCS by certain value $\Delta_k$ such that a={$m_{k+1}=m_k+\Delta_k$|$-\Delta_{max} \leq \Delta_k \leq \Delta_{max}$}.

The transition probability from state $s=(m_k,a_k)$ to state $s'=(m_{k+1}=m_k+\Delta_k, a_{k+1})$ by performing the action a may depend on the probability of receiving a positive or negative acknowledgement, indicated by $f_{m_{k-1}}(\bar{\gamma})$, when transmitting with MCS of index $m_{k+1}$, where $\bar{\gamma}$ may equal the average SINR of a group including the terminal. In some embodiments, $f_{m_{k+1}}(\bar{\gamma})$ may be calculated using a theoretical analysis assuming an interference and noise model, and/or may be obtained by using a channel simulator to capture the practical issues of the transmission line. The probability of transition Pr, may be calculated using the following equation.

$$Pr_a\{s,s'\} = \begin{cases} 1 - f_{m_k+1}(\bar{\gamma}) & \text{for } a_{k+1} = 1 \\ f_{m_k+1}(\bar{\gamma}) & \text{for } a_{k+1} = 0 \end{cases}$$

The immediate reward may be defined by the number of information bits that are successfully transmitted. In some embodiments, the number of information bits for each frame may depend on scheduling policy and the MCS. If the number of bits sent at time k is indicated as $T_k(m_k)$, the immediate reward $R_a$ may be calculated using the following equation.

$$R_a(s,s') = R_a(m_{k+1}) = a_{k+1} T_{k+1}(m_{k+1})$$

In some embodiments, the optimum policy may be calculated by solving the following equation, where $\alpha$ may be a discount factor between the values of 0 and 1.

$$V(s) = \max_a \left\{ \sum_{s'} P_a(s,s')[R_a(s,s') + \alpha V(s')] \right\}$$

In some embodiments, the above equations may be used by a terminal in a group to change its MCS index to an adjacent value. The use of the MDP may prompt the terminal to more quickly converge on an MCS or a range of MCSs that improve utilization of a channel.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of adjusting a modulation and coding scheme, the method comprising: selecting a modulation and coding scheme for a plurality of terminals by a base station; broadcasting a modulation and coding scheme identifier to the plurality of terminals, the modulation and coding scheme identifier configured to identify the selected modulation and coding scheme such that each of the plurality of terminals transmits a transmission to the base station based at least in part on the selected modulation and coding scheme; and receiving a second modulation and coding scheme identifier from one of the plurality of terminals, the second modulation and coding scheme identifier configured to identify a modulation and coding scheme adjusted at one of the plurality of terminals, wherein the adjusted modulation and coding scheme is determined by the one of the plurality of terminals performing operations comprising: calculating a success rate for the modulation and coding scheme; determining whether the success rate is within a target success rate range; and in response to the success rate being outside and less than the target success rate range, determining whether to decrease the modulation and coding scheme; or in response to the success rate being outside and greater than the target success rate range, determining whether to increase the first modulation and coding scheme.

2. The method of claim 1, wherein the modulation and coding scheme identifier is based on a modulation and coding scheme index configured to identify a plurality of modulation and coding schemes defined in a communication standard.

3. The method of claim 1, wherein the modulation and coding scheme is selected based at least in part on an average signal to interference plus noise ratio (SINR) of the plurality of terminals.

4. The method of claim 1, wherein the modulation and coding scheme is selected based at least in part on a lowest signal to interference plus noise ratio (SINR) of the plurality of terminals.

5. The method of claim 1, further comprising:
organizing the plurality of terminals into a group of terminals; and
informing each terminal of the plurality of terminals that the terminal is included in the group of terminals.

6. The method of claim 5, further comprising:
organizing the plurality of terminals into a cluster of terminals, wherein the cluster of terminals is a subset of the group of terminals; and
informing each terminal of the plurality of terminals that the terminal is included in a cluster of terminals.

7. The method of claim 6, further comprising organizing the plurality of terminals into a cluster of terminals based at least in part on a signal to interference plus noise ratio (SINR) of the plurality of terminals.

8. A method of adjusting a modulation and coding scheme, the method comprising: receiving a first modulation and coding scheme identifier at a terminal from a base station, the first modulation and coding scheme identifier configured to identify a first modulation and coding scheme; determining a second modulation and coding scheme at the terminal; transmitting a second modulation and coding scheme identifier from the terminal to the base station, the second modulation and coding scheme identifier configured to identify the second modulation and coding scheme; and transmitting a transmission to the base station based at least in part on the second modulation and coding scheme, wherein determining a second modulation and coding scheme at the terminal comprises: calculating a success rate for the first modulation and coding scheme; determining whether the success rate is within a target success rate range; and in response to the success rate being outside and less than the target success rate range, determining whether to decrease the first modulation and coding scheme; or in response to the success rate being outside and greater than the target success rate range, determining whether to increase the first modulation and coding scheme.

9. The method of claim 8, wherein the first modulation and coding scheme identifier includes a modulation and coding scheme index configured to identify a plurality of modulation and coding schemes defined in a wireless communication standard.

10. The method of claim 9, wherein the second modulation and coding scheme identifier includes an indicator that the modulation and coding scheme index has been one of increased or decreased.

11. The method of claim 8, wherein determining the second modulation and coding scheme is based at least in part on one of positive acknowledgements or negative acknowledgements received at the terminal from the base station.

12. The method of claim 8, wherein determining the second modulation and coding scheme is based at least in part on the target success rate range of transmissions transmitted by the terminal to the base station.

13. The method of claim 12, wherein: the first modulation and coding scheme is associated with a first data rate, and when the calculated success rate is above the target success rate range, the second modulation and coding scheme is associated with a second data rate faster than the first data rate.

14. The method of claim 12, wherein: the first modulation and coding scheme is associated with a first data rate, and when the calculated success rate is below the target success rate range, the second modulation and coding scheme is associated with a second data rate slower than the first data rate.

15. The method of claim 8, wherein the second modulation and coding scheme is based at least in part on a target error rate of transmissions transmitted by a terminal to the base station.

16. The method of claim 8, wherein: determining whether the success rate is within the target success rate range comprises determining whether the success rate is greater than or less than the target success rate range; determining whether to decrease the first modulation and coding scheme comprises: calculating a first probability based on the success rate of the first modulation and coding scheme and a success rate of a decreased modulation and coding scheme; generating a first random number between 0 and 1; and in response to the first probability being greater than the first random number, decreasing the first modulation and coding scheme, wherein the second modulation and coding scheme comprises the decreased first modulation and coding scheme; or determining whether to increase the first modulation and coding scheme comprises: calculating a second probability based on the success rate of the first modulation and coding scheme and a success rate of an increased modulation and coding scheme; generating a second random number between 0 and 1; and in response to the second probability being greater than the second random number, increasing the first modulation and coding scheme, wherein the second modulation and coding scheme comprises the increased first modulation and coding scheme.

17. A terminal comprising:
a processing device; and
a non-transitory computer storage medium having computer instructions stored thereon that are executable by the processing device to perform operations comprising:
receiving a first modulation and coding scheme index at the terminal from a base station, the first modulation and coding scheme index configured to identify a first modulation and coding scheme from a plurality of modulation and coding schemes;
determining a second modulation and coding scheme at the terminal;
transmitting an indicator from the terminal to the base station, the indicator configured to identify a second modulation and coding scheme from the plurality of modulation and coding schemes; and
transmitting a transmission from the terminal to the base station based at least in part on the second modulation and coding scheme, wherein determining a second modulation and coding scheme at the terminal comprises:
calculating a success rate for the first modulation and coding scheme;
determining whether the success rate is within a target success rate range; and
in response to the success rate being outside and less than the target success rate range, determining whether to decrease the first modulation and coding scheme; or
in response to the success rate being outside and greater than the target success rate range, determining whether to increase the first modulation and coding scheme.

18. The terminal of claim 17, wherein the indicator indicates that the first modulation and coding scheme index has been increased or decreased.

19. The terminal of claim 17, wherein determining the second modulation and coding scheme is based at least in part on the target success rate range of transmissions transmitted by the terminal to the base station.

20. The terminal of claim 17, wherein: the first modulation and coding scheme is associated with a first data rate, and when a calculated success rate is above the target success rate range, the second modulation and coding scheme is associated with a second data rate faster than the first data rate.

21. The terminal of claim 17, wherein: the first modulation and coding scheme is associated with a first data rate, and when a calculated success rate is below the target success rate range, the second modulation and coding scheme is associated with a second data rate slower than the first data rate.

* * * * *